United States Patent
Pawulski et al.

(10) Patent No.: US 10,882,744 B2
(45) Date of Patent: Jan. 5, 2021

(54) PURIFICATION OF HYDROGEN

(71) Applicant: L'Air Liquide, Societe Anonyme pour l'Etude et l'Exploitation des Procedes Georges Claude, Paris (FR)

(72) Inventors: Richard Pawulski, Houston, TX (US); Sylvain Houle, Ste-Julie (CA); Brian Fillion, Beloeil (CA); Yudong Chen, Longmont, CO (US); Graeme William Norval, Oakville (CA)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 201 days.

(21) Appl. No.: 16/191,719

(22) Filed: Nov. 15, 2018

(65) Prior Publication Data

US 2020/0156937 A1 May 21, 2020

(51) Int. Cl.
*B01D 53/04* (2006.01)
*C01B 3/56* (2006.01)
*B01D 53/68* (2006.01)

(52) U.S. Cl.
CPC .............. *C01B 3/56* (2013.01); *B01D 53/04* (2013.01); *B01D 53/685* (2013.01); *B01D 2253/102* (2013.01); *B01D 2257/20* (2013.01); *B01D 2257/2025* (2013.01); *B01D 2257/40* (2013.01); *C01B 2203/042* (2013.01); *C01B 2203/0465* (2013.01)

(58) Field of Classification Search
CPC .. B01D 53/04; B01D 53/0423; B01D 53/685; B01D 53/8662; B01D 2253/102; B01D 2256/16; B01D 2257/40; B01D 2257/702; B01D 2257/2025; B01D 2257/20; C01B 3/56; C01B 7/01; C01B 2203/042; C01B 2203/0465
USPC ........ 95/128, 132; 96/132; 423/239.1, 240 S
See application file for complete search history.

(56) References Cited

U.S. PATENT DOCUMENTS

| 5,338,458 | A | | 8/1994 | Carrubba et al. |
| 5,376,164 | A | | 12/1994 | Zarchy et al. |
| 5,607,647 | A | * | 3/1997 | Kinkead ............... A61L 9/046 422/122 |

(Continued)

FOREIGN PATENT DOCUMENTS

WO    WO 2008/088359    7/2008

OTHER PUBLICATIONS

International Search Report and Written Opinion for PCT/US2019/061162, dated Mar. 13, 2020.

*Primary Examiner* — Frank M Lawrence, Jr.
(74) *Attorney, Agent, or Firm* — Justin K. Murray

(57) ABSTRACT

An apparatus and method for purifying a raw hydrogen gas stream of chloramines and chlorine is provided. The explosive chloramines compounds can be effectively captured by the carbon adsorbent without accumulating on the carbon surface. Rather, the chloramines are converted via decomposition, into non-explosive products with catalytic effect of the carbon material. Chlorine reacts with impregnated reducing agent on the carbon surface to form the solid products, which can be adsorbed on the carbon surface. The purified hydrogen gas contains little to no trace of chloramines and chlorine impurities, thereby making the hydrogen gas suitable for liquid hydrogen production.

17 Claims, 2 Drawing Sheets

(56) References Cited

U.S. PATENT DOCUMENTS

| | | | |
|---|---|---|---|
| 5,914,455 A * | 6/1999 | Jain | B01D 53/0462 |
| | | | 95/106 |
| 7,361,280 B2 | 4/2008 | Baker | |
| 2001/0009125 A1* | 7/2001 | Monereau | B01J 20/28004 |
| | | | 95/117 |
| 2006/0254425 A1* | 11/2006 | Baksh | B01J 20/20 |
| | | | 96/132 |
| 2007/0122329 A1 | 5/2007 | Briglia et al. | |
| 2010/0180771 A1 | 7/2010 | Liu et al. | |
| 2018/0036671 A1* | 2/2018 | Russell | B01J 20/18 |
| 2018/0229217 A1* | 8/2018 | Mazzoccoli | B01J 20/3085 |
| 2018/0237298 A1 | 8/2018 | Ishida et al. | |
| 2018/0318749 A1 | 11/2018 | Dowaki et al. | |

\* cited by examiner

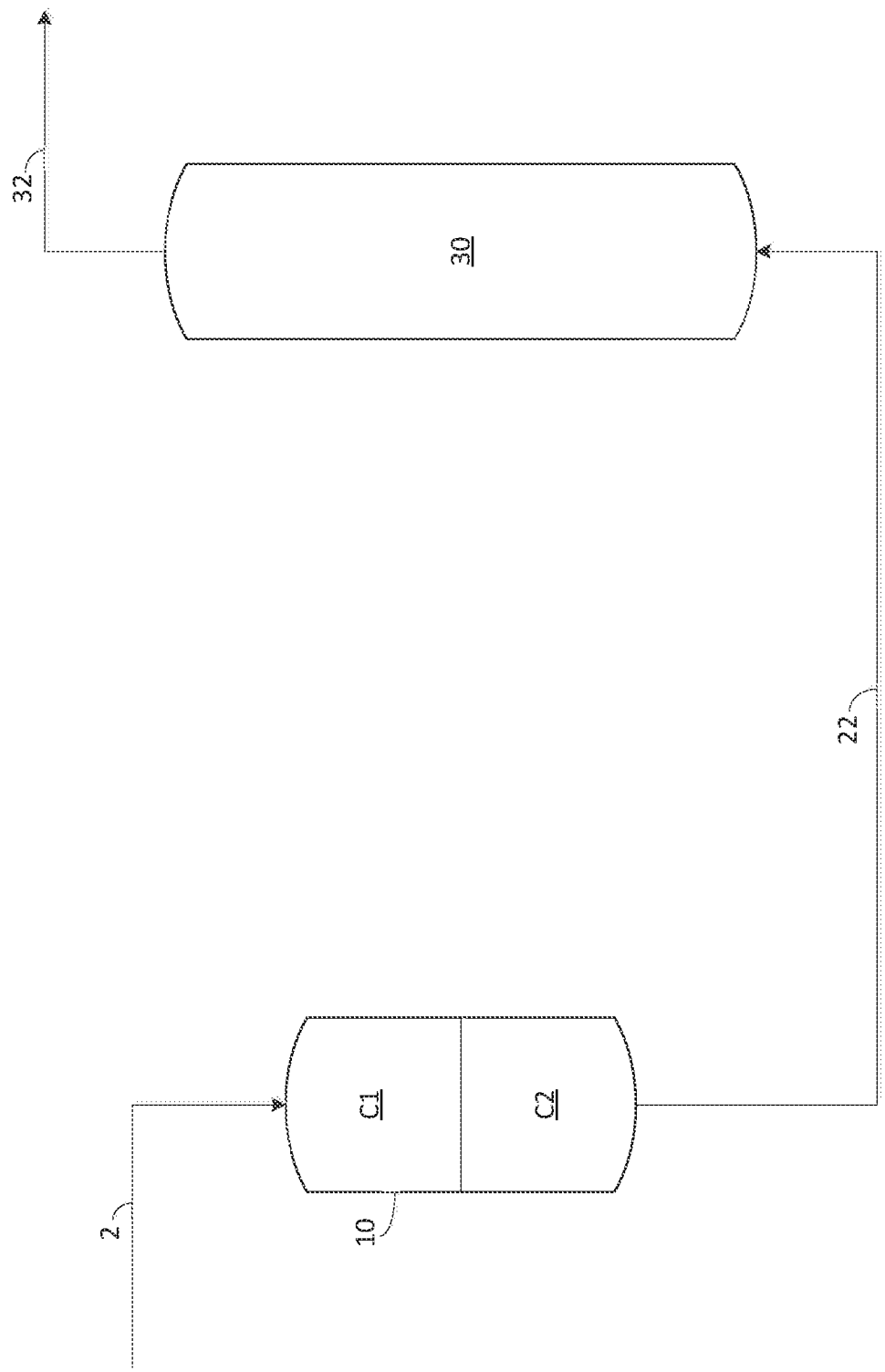

PURIFICATION OF HYDROGEN

TECHNICAL FIELD OF THE INVENTION

The present invention relates to a method and apparatus for the purification of raw hydrogen, and more specifically, the removal of chloramines.

BACKGROUND OF THE INVENTION

Raw hydrogen gas can be produced by various processes including the use of steam hydrocarbons reforming, coal gasification, biomass pyrolysis, water electrolysis and a waste gas from petrochemical industries or chlorine production by electrolysis of an alkali metal chloride solution. In the chlor-alkali industry, chlorine and sodium hydroxide are produced according to the chemical equation:

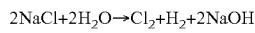
$$2NaCl+2H_2O \rightarrow Cl_2+H_2+2NaOH$$

This electrolysis process is conducted either in a mercury cell, a diaphragm cell or a membrane cell, which is used to separate the chlorine from the sodium hydroxide. The raw hydrogen is a by-product from the above reaction. This raw hydrogen normally contains impurities, such as chlorine ($Cl_2$) and ammonia ($NH_3$). The ammonia impurity usually comes from a residue ammonium nitrate, a component of a blasting agent, used in the rock salt mining process to obtain raw material of the alkali metal chloride. In addition, chlorine is normally present in cooling water; trace amount of chlorine can enter into raw hydrogen gas stream during water washing process or water cooling process due to leakage.

The presence of trace amounts of $Cl_2$ and $NH_3$ in the raw hydrogen system forms chloramines, which can exist in three forms: monochloramine ($NH_2Cl$), dichloramine ($NHCl_2$) and trichloramine ($NCl_3$). These chloramines observe an equilibrium relationship in solution depending on stoichiometry and pH:

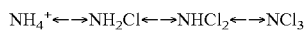
$$NH_4^+ \leftarrow \rightarrow NH_2Cl \leftarrow \rightarrow NHCl_2 \leftarrow \rightarrow NCl_3$$

All chloramines are highly unstable chemicals and their decomposition releases high amounts of energy.

In the case of liquefaction of this hydrogen, risks of accumulation and detonation are especially increased due to the freezing and deposition of these chloramine contaminants on the cryogenic equipment. It is therefore desirable to remove these contaminants from the gaseous feed hydrogen prior to introduction to the cryogenic liquefaction process equipment. Consequently, it is important to seek a breakthrough technology to remove chloramines and chlorine impurities from the hydrogen stream before entering the cryogenic process operation.

A published US patent application 2007/0122329 A1 discloses a process to purify raw hydrogen gas from chlorine production plant, which contains the impurities of chlorine, chloramines, ammonia, etc. Multiple aqueous scrubbing units are used in the process to remove those impurities. The first scrubbing system contains a reducing agent in solution to remove chlorine and chloramines from hydrogen. The second scrubbing unit containing an acid in solution to remove ammonia from hydrogen, and then the trace amount acid from the second unit is removed from a third water washing system. This method requires the use of multiple steps involving chemical absorption of chloramines with reaction agents in a scrubbing solution, and furthermore suffers large equipment costs, solvent degradation, equipment corrosion and intensive energy requirements.

SUMMARY OF THE INVENTION

The present invention is directed to an apparatus and a method that satisfies at least one of these needs.

Embodiments of the present invention provide a cost effective method for removing chloramines and chlorine from a hydrogen gas stream by using an adsorption technique. More importantly, the captured chloramines compounds in the adsorbent materials are not accumulative, but are decomposed to less dangerous non-explosive products. The thermal and chemical treated adsorbents, for example activated carbon, can be used in certain embodiments to remove and destroy chloramines and chlorine from the hydrogen stream, respectively. The purified hydrogen gas can then be sent to a cryogenic cold box to produce liquid hydrogen. This advantageously eliminates the risk of potential accumulation of chloramines in the cryogenic hydrogen liquefaction cold box and therefore assuring its safe operation.

An apparatus for purifying a raw hydrogen gas stream is provided. In one embodiment, the apparatus can include: a first adsorption unit having a first activated carbon disposed within the first adsorption unit, wherein the first activated carbon is configured to adsorb a first impurity from the raw hydrogen gas stream on a surface of the first activated carbon bed; and a second adsorption unit in fluid communication with an outlet of the first adsorption unit, the second adsorption unit having a second activated carbon disposed within the second adsorption unit, wherein the second activated carbon is configured to adsorb a second impurity on a surface of the second activated carbon bed.

In optional embodiments of the apparatus for purifying a raw hydrogen gas stream:

the first activated carbon is configured to remove chloramines from the raw hydrogen gas stream by decomposing the chloramines into non-explosive products;

the non-explosive products comprise hydrochloric acid and ammonium chloride;

the second activated carbon comprises a reducing agent impregnated on a surface of the second activated carbon;

the second activated carbon is configured to adsorb chlorine, wherein the reducing agent is configured to react with chlorine to form a solid reactant;

the first impurity is chloramine or a mixture of chloramines, wherein the second impurity is chlorine;

the first impurity is chlorine, wherein the second impurity is chloramine or a mixture of chloramines;

the first adsorption unit and the second adsorption unit are disposed within a common housing; and/or the raw hydrogen gas stream is sourced from a chlorine production facility.

In another embodiment, a method for purifying a raw hydrogen gas stream is provided. In this embodiment, the method can include the steps of: removing a first impurity from the raw hydrogen gas stream using a first activated carbon bed to produce a partially pure hydrogen stream; and removing a second impurity from the partially pure hydrogen stream using a second activated carbon bed to produce a purified hydrogen stream, wherein the first activated carbon bed comprises a first activated carbon that is configured to adsorb the first impurity on a surface of the first activated carbon bed, and wherein the second activated carbon bed comprises a second activated carbon that is configured to adsorb the second impurity on a surface of the second activated carbon bed.

In optional embodiments of the method for purifying a raw hydrogen gas stream:

the first activated carbon is configured to remove chloramines from the raw hydrogen gas stream by decomposing the chloramines into non-explosive products;

the non-explosive products comprise hydrochloric acid and ammonium chloride;

the second activated carbon comprises a reducing agent impregnated on a surface of the second activated carbon;

the second activated carbon is configured to adsorb chlorine, wherein the reducing agent is configured to react with chlorine to form a solid product;

the first impurity removed is chloramines, wherein the second impurity removed is chlorine;

the first impurity removed is chlorine, wherein the second impurity removed is chloramines;

the first activated carbon bed and the second activated carbon bed are disposed within a common catalyst bed; and/or the raw hydrogen gas stream is sourced from a chlorine production facility.

In another embodiment, a method for purifying a raw hydrogen gas stream can include the steps of: providing the raw hydrogen gas stream, wherein the raw hydrogen gas stream includes impurities comprising chloramines and chlorine; removing the impurities of chloramines and chlorine from the raw hydrogen gas stream to produce a purified hydrogen gas; and liquefying the purified hydrogen gas to produce liquid hydrogen; wherein the step of removing the impurities of chloramines and chlorine from the raw hydrogen gas stream to produce a purified hydrogen gas includes the steps of: adsorbing the chloramines on a surface of a first activated carbon and decomposing the chloramines to non-reactive products; and adsorbing the chlorine on a surface of a second activated carbon and reacting the chlorine with a reducing agent disposed on the surface of the second activated carbon.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 2 represents a second embodiment of the present invention.

DETAILED DESCRIPTION

Figure 1:
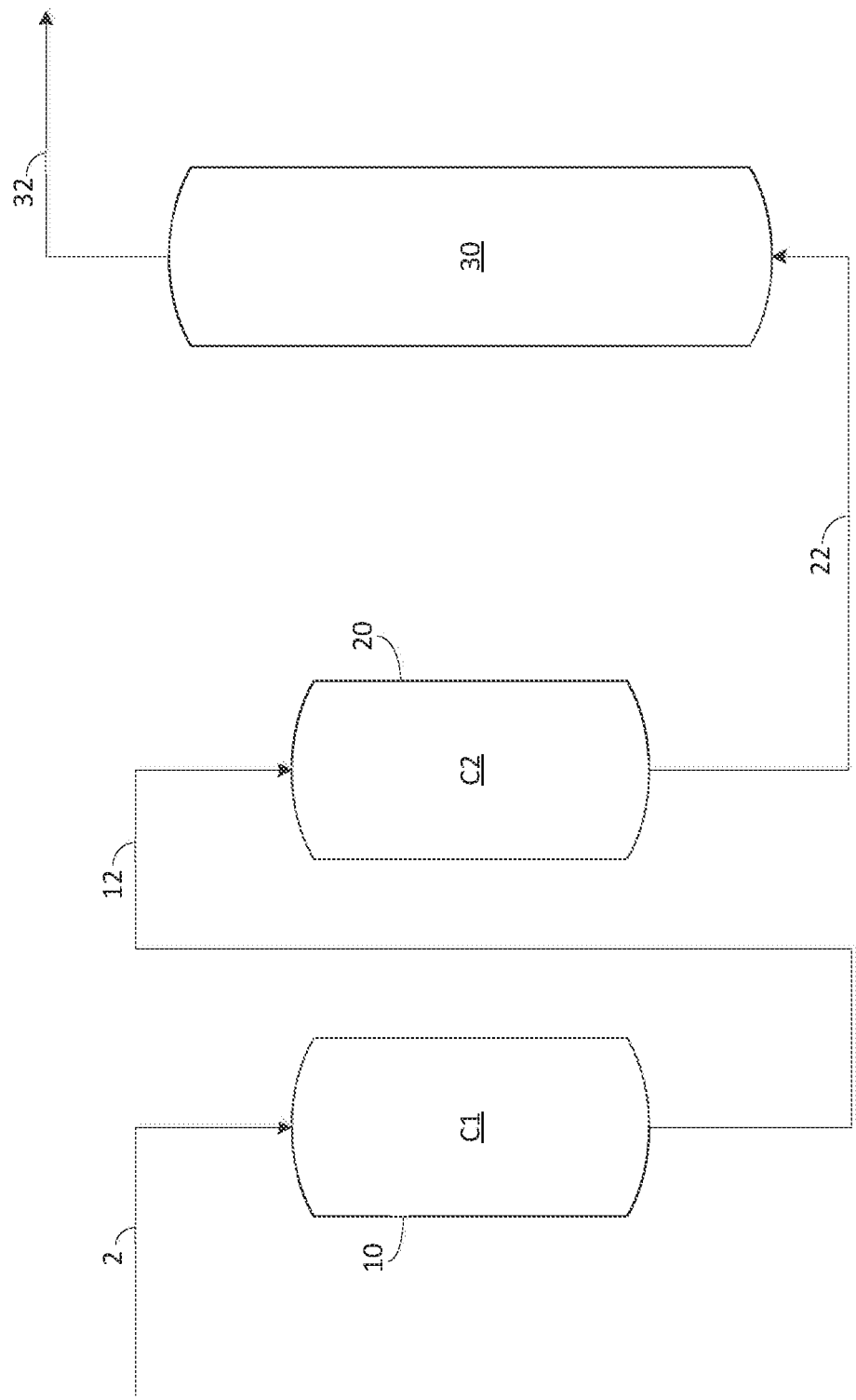
FIG. 1 represents an embodiment of the present invention.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In methods known heretofore, the removal of chloramines by either catalytic decomposing chloramines from an aqueous solution on a catalytically activated carbon surface or chemical absorption of chloramines with reaction agents in a scrubbing solution. As such, there is no teaching of a removal of chloramines and chlorine from a hydrogen gas stream by using chemisorption methods with thermal or chemically treated adsorbent materials.

To purify hydrogen gas of chloramines by chemical absorption with a reducing agent followed by subsequent purification treatment requires multiple scrubbing units. The process suffers large equipment costs, solvent degradation, equipment corrosion and intensive energy requirements. There is no report on chloramines adsorption and decomposition in hydrogen gas phase with the adsorbent materials. Certain embodiments of the present invention have the potential to overcome the disadvantages of using aqueous solutions to purify hydrogen streams from chlor-alkali facilities.

Certain embodiments of the present invention provide a cost effective method for removing chloramines and chlorine from a hydrogen gas stream by using an adsorption technique. In one embodiment, the captured chloramines compounds in the adsorbent materials are not accumulative, but can be decomposed to less dangerous non-explosive products. The thermal and chemical treated adsorbents, for example activated carbon, can be used in the proposed process to remove and destroy chloramines and chlorine from the hydrogen stream, respectively. The purified hydrogen gas is then sent to a cryogenic cold box to produce liquid hydrogen for the merchant business. This proposed method eliminates the risk of potential chloramines accumulation in the cryogenic hydrogen liquefaction cold box and therefore assuring its safe operation.

Certain embodiments of the invention employ a series of adsorbent beds, which contain different adsorbents to remove impurities of chloramines and chlorine from the hydrogen gas. In one embodiment, the first adsorbent bed comprises of an adsorbent to selectively remove the first impurity from hydrogen gas. The effluent stream from the first bed is fed to a second adsorbent bed packed with an adsorbent to selectively remove the second impurity from the hydrogen gas. The purified hydrogen gas is then sent to hydrogen cryogenic liquefaction unit to produce liquid hydrogen for merchant liquid hydrogen applications.

An example of an embodiment of the invention is shown in FIG. 1. The first adsorbent bed 10 is packed with adsorbent C1. In one embodiment, C1 is an activated carbon selected from any commercial available carbon family, which is capable of adsorbing and decomposing chloramines from hydrogen stream to form non-explosive products (e.g., $N_2$, $Cl_2$, HCl, $NH_4Cl$). These carbons can be manufactured with thermal treatment in a fashion to produce an active surface, which is configured to catalytically decompose chloramines. The second adsorbent bed 20 can be loaded with adsorbent C2. C2 can be an adsorbent treated with a chemical reducing agent for adsorption of chlorine. This adsorbent can be selected from any porous materials, such as alumina, silica, carbon or combinations of these. As a non-limiting example, C2 material used in this study is activated carbon. The reducing agent may be selected from the group consisting of sodium metabisulfite, sodium sulfite, sodium hyposulfite, sodium thiosulfate or combination of them. The activated carbon used in this study is impregnated with a reducing agent during its manufacturing process; particularly, the reducing agent used in the study is sodium thiosulfate ($Na_2S_2O_3$) in the carbon matrix. This reducing agent can effectively adsorb chlorine from hydrogen via chemisorptive mechanism, which irreversibly converts gas chlorine to harmless solid on the carbon surface.

The carbon adsorbents C1 and C2 may be employed in powder form, or preferably, in the form of particles, beads, extrudates or even a form of structured packing, which have the advantage of making it easier to handle the adsorbents; for example, filling or removing the adsorption beds' media. In addition, non-powder form adsorbents provide benefit of less pressure drop across the bed when the gas stream flows through the adsorbents during their use in the process.

One of the process configurations to remove chloramines and chlorine from hydrogen gas is shown in FIG. 1. The raw hydrogen gas 2, which can be sourced from a chlorine manufacture plant, often contains chloramine impurities (monochloramine $NH_2Cl$, dichloramine $NHCl_2$, and trichloramine $NCl_3$), chlorine and other impurities. The impurities range of total chloramines in raw hydrogen gas can be varied from a few ppb to more than several ppm depending on the process condition in the chlorine plant. Due to the risk of chloramine accumulation at cryogenic temperatures inside the hydrogen cold box during liquid hydrogen production, it is desired that the chloramine concentration in the hydrogen gas be below certain limit dependent on the flow rate of the hydrogen being treated; preferably less than 10 ppb.

The chlorine content in raw hydrogen is usually higher compared to other impurities, particularly chloramine impurities. The actual content of chlorine in hydrogen varies from a few ppb to more than several ppm dependent on the chlorine process upstream. The chlorine concentration in hydrogen should be as low as possible since trace amount of chlorine in hydrogen gas further reacts with ammonia to form additional chloramines before reaching the hydrogen liquefaction plant.

As shown in FIG. 1, raw hydrogen gas flows into first adsorbent bed 10, which is packed with activated carbon C1. The raw hydrogen gas containing trace impurities chloramines ($NCl_3$, $NHCl_2$ and $NH_2Cl$), chlorine and other impurities (like $NH_3$, $CO_2$, $H_2O$, etc.) flows through first adsorbent bed 10 at a downward flow direction (from top to bottom of the bed). The purpose of hydrogen flow in a downward flow through the bed is to avoid potential adsorbent fluidization and to eliminate potential water accumulation inside the bed. The pressure of raw hydrogen stream from the chlorine plant is usually between ambient to 20 bara with the temperature varying from ambient to 100° C. The velocity of hydrogen gas inside bed 10 is determined by the adsorption kinetics to minimize unused adsorbent material due to the impurities mass transfer length or designed by its attrition velocity to avoid potential particle fluidization inside the bed.

In one embodiment, the activated carbon C1 in bed 10 captures chloramines and decomposes them into non-explosive products hydrochloric acid (HCl), nitrogen, and ammonium chloride ($NH_4Cl$). The amount of produced chlorides ($NH_4Cl+HCl$) equals the total amount of chloramines adsorbed. In this decomposition reaction, the activated carbon C1 acts as a catalyst to stimulate the targeted reaction. The catalytic decomposition reaction requires water vapor, however, since the raw hydrogen gas coming from a chlorine production plant typically contains water vapor, no externally provided water vapor is typically required. The chloramine decomposition produces $Cl_2$, $N_2$, HCl and $NH_4Cl$. With water adsorption and condensation from the vapor, it forms a relatively concentrated acid solution on the carbon surface. The activated carbon C1 loses its catalytic adsorptive capability when it is completely saturated with the strong acid solutions of HCl and $NH_4Cl$. Part of chlorine in hydrogen can also be adsorbed on the activated carbon C1 surface but the majority of chlorine passes through first adsorbent bed 10.

Partially cleaned gas 12 enters into second adsorbent bed 20, which is preferably packed with carbon C2 adsorbent material. The activated carbon C2 is a special chemical treated activated carbon with impregnation of a reducing agent. In one embodiment, the trace chlorine adsorbs on the C2 activated carbon via chemisorption. It reacts with impregnated reducing agent (for example $Na_2S_2O_3$) to form solid reactants, like elements S, NaCl, $Na_2S_4O_6$, and $Na_2SO_4$. These solid products are captured on the porous carbon surface. The activated carbon C2 loses its capacity when the carbon surface is completely covered by the solid reaction products.

Following removal of the impurities, purified hydrogen gas 22 exits second adsorbent bed 20 and is introduced to hydrogen liquefaction unit 30 in order to produce liquid hydrogen 32. For purposes of this invention, any known method/apparatus can be used for the liquefaction of hydrogen.

The impurities captured in both activated carbon C1 and C2 are based on chemical reactions. The reaction products are normally adsorbed on carbon surface, which causes adsorbents to become deactivated once their surface becomes completely covered by reaction products. In general, C1 and C2 carbons are not regenerable. The carbon materials are preferably replaced with fresh materials when they are deactivated.

Although, FIG. 1 indicates a preferred bed arrangement, the order of the beds in the process can be inter-changeable. For example, raw hydrogen 2 may flow through the first bed 10 containing C2 adsorbent to remove desired impurity chlorine, and then to the second bed 20 packed with C1 material to remove second impurities chloramines. Each bed may contain multiple units so that the process can be continued during adsorbent replacement. For example, first adsorbent bed 10 may include two separate beds such that one unit can be taken offline in order to recharge the unit with clean adsorbent when it becomes saturated with the specific impurity. The process continues with unit without interruption. While FIG. 1 shows that the hydrogen flow is in downward flow to each adsorbent bed, a co-current direction or mixed direction flow can also be used in the process. The purified hydrogen gas exits bed 2 contains no chloramine or chlorine impurities. It is therefore suitable for liquid hydrogen production in cryogenic temperatures.

In another embodiment, C1 and C2 activated carbons can be packed in the same bed 10 as shown in FIG. 2. The amount of C1 and C2 carbons in the bed is determined by amount of impurities chloramines and chlorine in the hydrogen. The order of C1 and C2 adsorbent packed in the bed relying on chloramines decomposition and chlorine reaction kinetics. It is preferable that an impurity with a slower adsorption kinetics is removed first. That is because slower adsorption kinetics results in a longer mass transfer zone in the bed. Although C1 and C2 adsorb large amount of targeted impurities, they can also capture small amount of other impurities on their carbon surfaces. Therefore, removing impurity with slower adsorption kinetics first followed by another carbon layer reduces mass transfer length.

In embodiment, chloramines decomposition rate on C1 carbon surface can be slower than chlorine reaction rate with reducing agent on C2 adsorbent. Therefore, a preferred bed configuration is shown in FIG. 2 even though the order of layer C1 and C2 can still be interchangeable.

The examples below demonstrate lab experimental studies for chloramines decomposition and chlorine reaction in the desired activated carbon materials.

Example 1: Chlorine $Cl_2$ Removal with Activated Carbon C2

This non-limiting example demonstrates chlorine chemisorption by using activated carbon C2 adsorbent. A 7.17 (g) activated carbon C2 with particle diameter 1.5±0.5 mm was packed in a 10 ml volume plastic tube. For safety reason, a helium carrier gas was used in the experiments instead of hydrogen. The pre-mixed chlorine solution was set at temperature 5° C. and near ambient pressure. Helium gas bubbled through the pre-mixed chlorine solution to carry off desired amount of chlorine into the packed adsorbent. Helium flow rate was set at 100 ml/min with gas residence time 6 seconds in the packed tube. The results are shown in Table 1 below:

TABLE 1

Experimental Results for Example 1

|  | At 48 hours | At 120 hours |
|---|---|---|
| $Cl_2$ gas concentration - inlet | 220 ppm | 63 ppm |
| $Cl_2$ gas concentration - outlet | 0.008 ppm | 0.004 ppm |
| Effectiveness ($C_{inlet}/C_{outlet}$) | 27500 times | 18000 times |

After completion of the chlorine adsorption experiments, the activated carbon C2 adsorbent was removed from the tube and analyzed for contaminations. Analysis results show traces of $NHCl_2$, element S, NaCl, $Na_2SO_4$, and $Na_2S_2O_3$.

Example 2: Monochloramine $NH_2Cl$ Removal with Activated Carbon C1

This non-limiting example demonstrates monochloramine adsorption and decomposition on the carbon surface. A 5.62 (g) activated carbon C1 with particle diameter 1.5±0.5 mm was packed in a 10 ml volume plastic tube. Helium carrier gas was used in the experiments. The pre-prepared monochloramine solution was set at temperature 22° C. and near ambient pressure. Helium gas bubbled through the prepared monochloramine solution to carry off desired amount of monochloramine into the carbon adsorbent. The helium flow rate was set at 100 ml/min with gas residence time 6 seconds in the tube. The results are shown in Table 2 below:

TABLE 2

Experimental Results for Example 2

|  | At 24 hours | At 192 hours |
|---|---|---|
| $NH_2Cl$ gas concentration - inlet | 264.3 ppm | 165.1 ppm |
| $NH_2Cl$ gas concentration - outlet | 0.018 ppm | 0.033 ppm |
| Effectiveness ($C_{inlet}/C_{outlet}$) | 14683 times | 5003 times |

After completion of the monochloramine adsorption experiments, the activated carbon C1 was removed from the tube and analyzed for contaminations. Analysis results show water, $NH_4Cl$, $NH_3$, traces of $NHCl_2$, pH=4.5 and no organic chlorides. The amount of chlorides ($NH_4Cl$) was equivalent to the total amount of monochloramine adsorbed.

Example 3: Dichloramine $NHCl_2$ Removal with Activated Carbon C1

This example demonstrates dichloramine adsorption and decomposition on the carbon surface. A 5.56 (g) activated carbon C1 with particle diameter 1.5±0.5 mm was packed in a 10 ml volume plastic tube. A helium carrier gas was used in the experiments. The pre-prepared dichloramine solution was set at temperature 10° C. and near ambient pressure. He gas bubbled through the prepared dichloramine solution to carry off desired amount of dichloramine into the packed carbon adsorbent. The helium flow rate was set at 120 ml/min with gas residence time 5 seconds in the packed tube. The results are shown in Table 3 below:

TABLE 3

Experimental Results for Example 3

|  | At 24 hours | At 192 hours | At 247.2 hours |
|---|---|---|---|
| $NHCl_2$ gas concentration - inlet | 242.7 ppm | 186.1 ppm | 135.1 ppm |
| $NHCl_2$ gas concentration - outlet | 0.083 ppm | 0.155 ppm | 60.3 ppm |
| Effectiveness (Cinlet/Coutlet) | 2924 times | 1200 times | 2.2 times |

After completion of the dichloramine adsorption experiments, the activated carbon C1 adsorbent was removed from the tube and analyzed for contaminations. Analysis results show water, $NH_4Cl$, HCl, traces of $NH_2Cl$, pH=1.2 and no organic chlorides. The amount of chlorides ($NH_4Cl$+HCl) was equivalent to the total amount of dichloramine adsorbed.

Example 4: Dichloramine $NHCl_2$ Removal with Activated Carbon C1

This example demonstrates dichloramine adsorption and decomposition on the carbon surface with much longer residence time. A 5.59 (g) activated carbon C1 with particle diameter 1.5±0.5 mm was packed in a 10 ml volume plastic tube. The carrier gas helium was used in the experiments. The pre-prepared dichloramine solution was set at temperature 5° C. and near ambient pressure. Helium gas bubbled through the prepared dichloramine solution to carry off desired amount of dichloramine into the packed carbon adsorbent. He flow rate was set at 20 ml/min with gas residence time 30 seconds in the packed tube. The results are shown in Table 4 below:

TABLE 4

Experimental Results for Example 4

|  | At 24 hours | At 144 hours |
|---|---|---|
| $NHCl_2$ gas concentration - inlet | 35.4 ppm | 14.2 ppm |
| $NHCl_2$ gas concentration - outlet | 0.00035 ppm | 0.0009 ppm |
| Effectiveness (Cinlet/Coutlet) | 101143 times | 15435 times |

After completion of the dichloramine adsorption experiments, the activated carbon C1 adsorbent was removed from the tube and analyzed for contaminations. Analysis results show water, $NH_4Cl$, HCl, traces of $NH_2Cl$, pH=1.1 and no organic chlorides.

Example 5: Trichloramine $NCl_3$ Removal with Activated Carbon C1

This example demonstrates trichloramine adsorption and decomposition on the carbon surface. A 5.44 (g) activated carbon C1 with particle diameter 1.5±0.5 mm was packed in a 10 ml volume plastic tube. Helium carrier gas was used in the experiments. The pre-prepared trichloramine solution was set at temperature 5° C. and near ambient pressure. Helium gas bubbled through the prepared trichloramine solution to carry off desired amount of trichloramine into the packed carbon adsorbent. The flow rate was set at 100 ml/min with gas residence time 6 seconds in the packed tube. The results are shown in Table 5 below:

TABLE 5

Experimental Results for Example 5

|  | At 24 hours | At 144 hours | At 192 hours |
|---|---|---|---|
| $NCl_3$ gas concentration - inlet | 1320 ppm | 238.1 ppm | 135.1 ppm |
| $NCl_3$ gas concentration - outlet | 0.00035 ppm | 0.0012 ppm | 0.0 ppm |
| Effectiveness (Cinlet/Coutlet) | 3771429 times | 196777 times | |

After completion of the trichloramine adsorption experiments, the activated carbon C1 adsorbent was removed from the tube and analyzed for contaminations. Analysis results show water, $NH_4Cl$, HCl, traces of $NH_2Cl$, pH=1.1 and no organic chlorides and $NCl_3$. The amount of chlorides ($NH_4Cl$+HCl) was equivalent to the total amount of trichloramine adsorbed.

Example 6: Purification of Feed Gas from a Chlor-Alkali Plant

This example demonstrates the effectiveness of treating a gas typical from a chlor-alkali plant. Known contaminants of this gas include monochloramine, dichloramine, trichloramine, chlorine, ammonia and water vapor. With a detectability limitation of 1 ppb, the effectiveness of the chloramine contaminant removal was verified using C1 activated carbon.

A test unit with adsorbent bed diameter of 1.26 inch was installed in a chlor-alkali plant. The unit was operated at pressure 1.95 bara and temperature 42 C. A 73 gram C1 sample, with mesh size 4×6, was fed the hydrogen feed gas at bed superficial velocity 0.62 m/s. The results are shown in Table 6 below:

TABLE 6

Experimental Results for Example 6

|  | At 286 hours | At 624 hours | At 1968 hours |
|---|---|---|---|
| $NH_2Cl$ gas concentration - inlet | 147.9 ppb | 49.5 ppb | 14.8 ppb |
| $NH_2Cl$ gas concentration - outlet | <1 ppb | <1 ppb | 0.1 ppb |
| $NHCl_2$ gas concentration - inlet | <1 ppb | <1 ppb | 05 ppb |
| $NHCl_2$ gas concentration - outlet | <1 ppb | <1 ppb | <1 ppb |
| $NCl_3$ gas concentration - inlet | 3.22 ppb | 0.74 ppb | 0.12 ppb |
| $NCl_3$ gas concentration - outlet | <1 ppb | <1 ppb | <1 ppb |

In conclusions, embodiments of the invention provide a cost effective solution for removing chloramines and chlorine from hydrogen gas, particularly a raw hydrogen gas stream coming from chlorine production plant. The explosive chloramines compounds can be effectively captured by the carbon adsorbent without accumulating on the carbon surface. Rather, the chloramines are converted via decomposition, into non-explosive products with catalytic effect of the carbon material. Chlorine reacts with impregnated reducing agent on the carbon surface to form the solid products, which can be adsorbed on the carbon surface. The purified hydrogen gas contains little to no trace of chloramines and chlorine impurities, thereby making the hydrogen gas suitable for liquid hydrogen production.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps can be combined into a single step.

The singular forms "a", "an", and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or about another particular value. When such a range is expressed, it is to be understood that another embodiment is from the one particular value and/or to the other particular value, along with all combinations within said range.

We claim:

1. An apparatus for purifying a raw hydrogen gas stream, the apparatus comprising:
a first adsorption unit having a first activated carbon disposed within the first adsorption unit, wherein the first activated carbon is configured to adsorb a first impurity from the raw hydrogen gas stream on a surface of the first activated carbon bed; and
a second adsorption unit in fluid communication with an outlet of the first adsorption unit, the second adsorption unit having a second activated carbon disposed within the second adsorption unit, wherein the second activated carbon is configured to adsorb a second impurity on a surface of the second activated carbon bed,
wherein the first impurity is chloramine or a mixture of chloramines, wherein the second impurity is chlorine.

2. The apparatus as claimed in claim 1, wherein the first activated carbon is configured to remove chloramines from the raw hydrogen gas stream by decomposing the chloramines into non-explosive products.

3. The apparatus as claimed in claim 2, wherein the non-explosive products comprise hydrochloric acid and ammonium chloride.

4. An apparatus for purifying a raw hydrogen gas stream, the apparatus comprising:
a first adsorption unit having a first activated carbon disposed within the first adsorption unit, wherein the first activated carbon is configured to adsorb a first impurity from the raw hydrogen gas stream on a surface of the first activated carbon bed; and a second adsorption unit in fluid communication with an outlet of the first adsorption unit, the second adsorption unit having a second activated carbon disposed within the second adsorption unit, wherein the second activated carbon is configured to adsorb a second impurity on a surface of the second activated carbon bed, wherein the second activated carbon comprises a reducing agent impregnated on a surface of the second activated carbon.

5. The apparatus as claimed in claim 4, wherein the second activated carbon is configured to adsorb chlorine, wherein the reducing agent is configured to react with chlorine to form a solid reactant.

6. An apparatus for purifying a raw hydrogen gas stream, the apparatus comprising:
a first adsorption unit having a first activated carbon disposed within the first adsorption unit, wherein the first activated carbon is configured to adsorb a first impurity from the raw hydrogen gas stream on a surface of the first activated carbon bed; and
a second adsorption unit in fluid communication with an outlet of the first adsorption unit, the second adsorption unit having a second activated carbon disposed within the second adsorption unit, wherein the second activated carbon is configured to adsorb a second impurity on a surface of the second activated carbon bed,
wherein the first impurity is chlorine, wherein the second impurity is chloramine or a mixture of chloramines.

7. The apparatus as claimed in claim 1, wherein the first adsorption unit and the second adsorption unit are disposed within a common housing.

8. The apparatus as claimed in claim 1, wherein the raw hydrogen gas stream is sourced from a chlorine production facility.

9. A method for purifying a raw hydrogen gas stream, the method comprising the steps of:
a) removing a first impurity from the raw hydrogen gas stream using a first activated carbon bed to produce a partially pure hydrogen stream; and
b) removing a second impurity from the partially pure hydrogen stream using a second activated carbon bed to produce a purified hydrogen stream;
wherein the first activated carbon bed comprises a first activated carbon that is configured to adsorb the first impurity on a surface of the first activated carbon bed,
wherein the second activated carbon bed comprises a second activated carbon that is configured to adsorb the second impurity on a surface of the second activated carbon bed,
wherein the raw hydrogen gas stream is sourced from a chlorine production facility.

10. The method as claimed in claim 9, wherein the first activated carbon is configured to remove chloramines from the raw hydrogen gas stream by decomposing the chloramines into non-explosive products.

11. The method as claimed in claim 10, wherein the non-explosive products comprise hydrochloric acid and ammonium chloride.

12. The method as claimed in claim 9, wherein the second activated carbon comprises a reducing agent impregnated on a surface of the second activated carbon.

13. The method as claimed in claim 12, wherein the second activated carbon is configured to adsorb chlorine, wherein the reducing agent is configured to react with chlorine to form a solid product.

14. The method as claimed in claim 9, wherein the first impurity removed is chloramines, wherein the second impurity removed is chlorine.

15. The method as claimed in claim 9, wherein the first impurity removed is chlorine, wherein the second impurity removed is chloramines.

16. The method as claimed in claim 9, wherein the first activated carbon bed and the second activated carbon bed are disposed within a common catalyst bed.

17. A method for purifying a raw hydrogen gas stream, the method comprising the steps of:
providing the raw hydrogen gas stream, wherein the raw hydrogen gas stream includes impurities comprising chloramines and chlorine;
removing the impurities of chloramines and chlorine from the raw hydrogen gas stream to produce a purified hydrogen gas; and
liquefying the purified hydrogen gas to produce liquid hydrogen;
wherein the step of removing the impurities of chloramines and chlorine from the raw hydrogen gas stream to produce a purified hydrogen gas includes the steps of:
adsorbing the chloramines on a surface of a first activated carbon and decomposing the chloramines to non-reactive products; and
adsorbing the chlorine on a surface of a second activated carbon and reacting the chlorine with a reducing agent disposed on the surface of the second activated carbon.

* * * * *